April 26, 1960  R. A. WARREN ET AL  2,934,584
ALKALINE CELL HAVING CONTROLLED VENTS
Filed June 17, 1957

Inventors,
Robert A. Warren
Milton E. Wilke
and Joseph J. Coleman
By: Jones, Narbo & Robertson, Attys.

United States Patent Office 2,934,584
Patented Apr. 26, 1960

2,934,584

ALKALINE CELL HAVING CONTROLLED VENTS

Robert A. Warren, Milton E. Wilke, and Joseph J. Coleman, Freeport, Ill., assignors, by mesne assignments, to Servel, Inc., Evansville, Ind., a corporation of Delaware Application June 17, 1957, Serial No. 665,953

9 Claims. (Cl. 136—133)

This invention relates to primary electric cells and more particularly refers to air-tight enclosures for such cells having improved gas venting means.

Alkaline primary cells, especially those containing mercuric oxide depolarizers, have very desirable properties, among the most useful of which is high capacity per unit volume. Such cells are generally comprised of an amalgamated zinc anode, a mercuric oxide cathode, an alkaline electrolyte substantially immobilized in an absorbent separator such as Webril, and a metallic container for the cell. Because of the highly caustic nature of the electrolyte, it is important that the cell closure be air-tight, first to prevent the electrolyte from leaking out, and second to prevent the carbon dioxide present in the air from entering the cell and forming a carbonate with the alkali electrolyte.

During the operation of an alkaline cell, and even on standing, gas may form in the cell. Consequently, in spite of the fact that the cell closure must normally be air-tight, provision must be made to vent the gas thus formed in order to prevent the cell casing from bulging or, in some cases, even exploding.

The prior art is replete with the attempts by various means to provide such cell closures which are air-tight but which still permit the venting of the gases formed. One method has been to provide a closed crack or split in the wall of the cell container. Another method has been to weaken the cell wall at a point to enable it to rupture at a predetermined gas pressure. Another method has been to provide a spring force maintained against the sealing member. In most cases the venting means was provided mainly for emergencies and was not useful for venting under normal use. Even where means was provided for venting under normal conditions, because of the nature of the structures, it was impossible to predetermine the pressure release operating conditions with precision.

It is an object of the present invention to provide an alkaline primary cell having a structure which prevents the electrolyte or reduced mercury from escaping out of the cell.

It is a further object to provide a cell having a means for venting any gases formed and wherein the pressure at which gases will be vented can be predetermined with precision.

Other objects and advantages of the invention will become more apparent from the following description taken in conjunction with the accompanying drawing in which.

Figure 1:
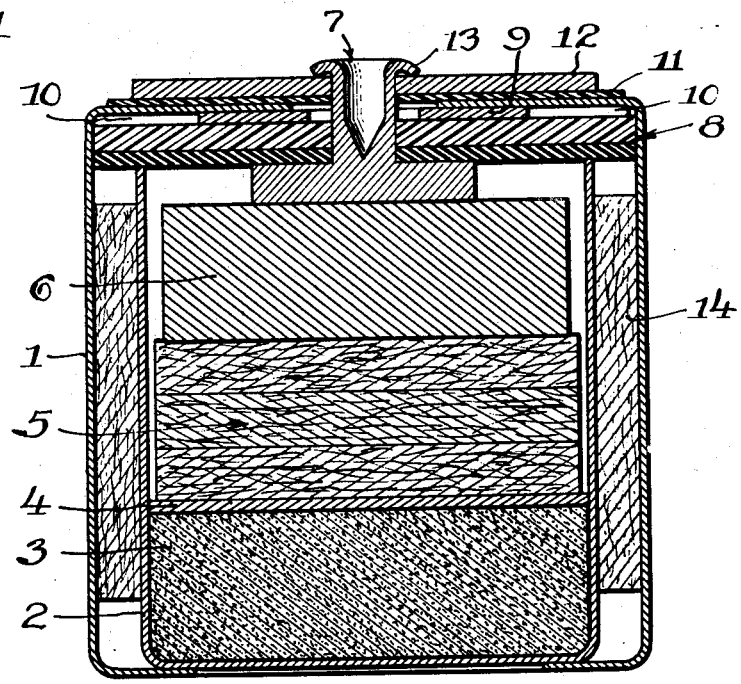
Fig. 1 is a vertical sectional view of the cell embodying the structure of the present invention.
Figure 2:
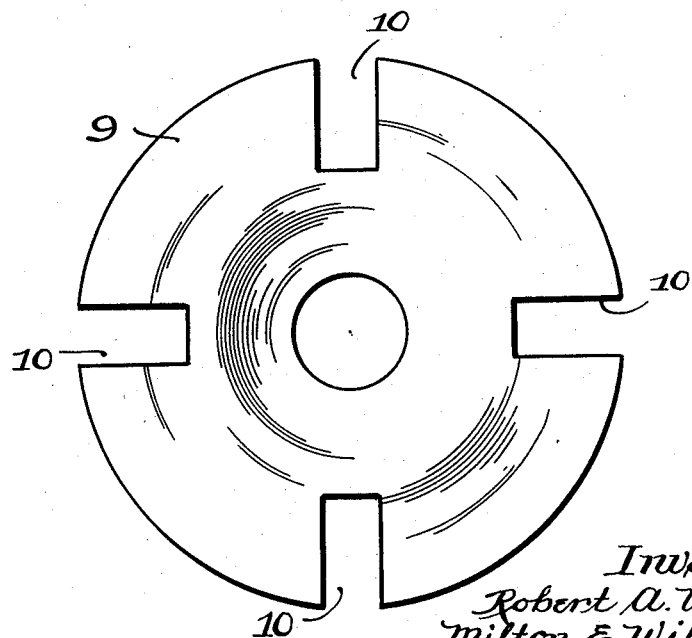
Fig. 2 is a top view of a vent control disc used as a means of regulating sealing pressure.

In the cell embodiment shown in Fig. 1, two open top cups 1 and 2 are arranged in nested position forming the enclosure for the cell. The cups are both made of a suitable rigid material such as steel or nickel plated steel. The inner cup 2 is of a smaller diameter and somewhat shorter in height than the outer cup 1. The cups are nested within each other and oppositely directed with an annular space provided between them. Arranged in stacked relationship within the interior of the inner cup 2 are the active chemical elements of the cell. The depolarizing cathode 3 is composed of a mixture of a powdered oxygen-yielding substance such as mercuric oxide, mercurous oxide, silver oxide, silver peroxide, cupric oxide, cuprous oxide or other readily-reduceable oxygen-yielding compounds or mixture of such compounds, and a suitable conductive substance such as micronized graphite. The depolarizer is compressed into the bottom of the cup 2 to a height of about ⅓ that of the cup. Above the depolarizer is a relatively thin barrier disc 4, a body of electrolyte-receptive material 5, and a zinc anode 6. The barrier disc may be made of a material such as parchment paper. The preferred electrolyte-receptive material is Webril, a fibrous cellulose pad. Other materials that may be used are wood fibers, cotton fibers, etc. The electrolyte-receptive body 5 is of cylindrical shape and has a diameter smaller than the internal diameter of the inner cup 2, whereby an annular space is provided between the cup 2 and the body 5. The body 5 is under compression between the anode 6 and the barrier disc 4 and is sufficiently porous to be highly absorbent of liquid electrolyte in the cell. The zinc anode is preferably composed of amalgamated zinc powder pressed together.

In the embodiment illustrated in Fig. 1, the vent control assembly and the negative terminal assembly are affixed to the bottom of the outer can. This assembly comprises first a rivet having a head 7 which is in pressure contact with the anode 6. The head of the rivet is preferably coated with a metal such as zinc to prevent chemical action by the electrolyte thereon. Over the shaft of the rivet and against the rivet head is then placed a sealing disc 8. The sealing disc contains a layer of a resilient material such as neoprene, polyethylene, modified polystyrene, vinyl plastic, or vulcanized fiber. As shown in Fig. 1, the disc may have a laminated construction. Preferably the upper layer 8 is of a semi-rigid material such as a laminated phenolic resin sheet, a melamine resin sheet reinforced with fiber glass. The layer of a resilient material is laminated to the less resilient disc. The sealing disc is of substantially the same diameter as the inside of the large can. It is maintained in pressure contact with the lip of the inner cup. Above the sealing disc is positioned the vent control disc 9. This disc is of a non-resilient material, preferably sheet metal. The disc has a hole in the center which is sufficiently large so that no contact is made with the body of the rivet. The disc is provided with gaps or recesses 10 over the area where the sealing lid makes contact with the lip of the inner can. As a result, the areas of the sealing disc immediately under these gaps are not supported and the only sealing force in those areas result from the resilience of the sealing disc material itself. When the pressure within the cell has reached a predetermined value, the sealing disc will bow slightly into the gap of the vent control disc and allow some of the gas to escape. Over the vent control disc 9 is the bottom of the outer can 1. A hole is provided in the outer can bottom to allow the terminal to extend therethrough. An annular space is provided between the outer can and the terminal rivet of sufficient dimension to prevent electrical shorting of the rivet against the outer can. On the outside of the outer can and over the rivet is placed a plastic insulating disc 11 of a material such as Mylar (a polyester film), and over this is placed a washer 12 of a rigid conducting material such as steel. The end of the rivet 13 is upset over the metal washer 12 and the negative terminal and the venting and sealing elements are then held together.

The outer cam is crimped over the inner cup to provide the inner cup edge with a sufficient force against the vent control disc to compress the neoprene disc of the sealing lid against the inner cup edge to maintain a good airtight seal. The vent control disc has gaps or notches cut out of its periphery. When gas forms within the inner can, pressure is created against the laminated sealing lid pushing it against the vent control disc. When the pressure is sufficiently great the laminated sealing disc will become slightly bowed in the unsupported areas. This allows the sealing disc to be slightly lifted away from the inner can edge and gas under pressure to escape. When the pressure inside the can has been reduced, the resilience of the sealing disc causes it once more to form a closed seal with the inner can lip.

The vent control disc of the present invention may be used with several different types of cell structures. The necessary requirements of the cell structure are that all the active cell elements be enclosed within one cup, that the sealing disc be somewhat larger than the diameter of the can and be positioned in pressure contact against the can edge, and that the vent control disc be held in pressure contact against the sealing disc urging the sealing disc against the can. Additionally a means must be provided to apply axial force to the vent control disc causing it to maintain the sealing disc against the can edge in order to maintain a closed seal. The force-producing means shown in the embodiment of Fig. 1 is an outer can which telescopes over the inner cup and whose edge is crimped over an end of the inner can.

The pressure at which the vent will operate is dependent upon a number of factors. Among these factors are the resiliency of the laminated disc, the size and shape of the notches in the vent control disc and their relationship, and the force exerted by the crimped outer can which tends to compress the lip of the inner cup against the neoprene disc.

In the venting means of the prior art, it was difficult to predetermine and maintain within precise limits the venting pressure, especially when mass production methods were used to produce the cell parts and assemble them. In the present invention, on the other hand, the physical properties of the material for the laminated disc can be carefully chosen and maintained within accurate limits, the size of the notches provided in the control disc may be very precisely determined, and the crimping pressure may also be accurately and uniformly maintained from cell to cell even in mass production.

It is generally desirable that the venting should not begin until the pressure within the cell has attained a value of about 50 to 200 pounds per square inch. A pressure of this magnitude is not at all harmful to the cell and a seal which is able to contain a pressure of that magnitude will be able to insure that the electrolyte will not leak out. The value for the upper pressure limit is determined mainly by the limitation of the strength of the cell components. The cans normally used for alkaline cells are made of steel and will not bulge or distort in any way until a pressure of about 250 pounds per square inch is attained. Consequently, by limiting the venting pressure to the range from about 50 to about 200 pounds per square inch freedom for bulging or explosing will be insured, and the cell will be air-tight at the lower gas pressures.

The critical components may be varied in a number of ways to attain the desired venting. For instance, instead of providing four notches or gaps in the vent control disc as shown in the illustration, only one notch may be used which may be of any size or shape. If large notches are used, the sealing lid must be made correspondingly less resilient so that the seal will not be opened until sufficient pressure is reached. Alternatively, a greater crimping pressure may be applied to force a tighter seal between the lip and the sealing disc. If the notch in the control disc is made smaller, the sealing disc must necessarily be made less stiff so that it still will release at the desired pressure.

Once the dimensions and materials used for the sealing lid and vent control disc have been fixed, the venting pressure is determined by the force exerted by the crimped outer can. This in turn is determined by regulating the crimping apparatus to give the desired degree of crimp.

In order to determine empirically the optimum sealing force for obtaining the desired range of venting pressure for the above set of conditions, dummy cells were fabricated as follows:

Inner and outer cans comprising the dummy cell were made from .015 inch thick deep drawing steel. The dimensions of the inner can were .875 inch diameter x .523 inch high. The edge of the inner can was ground to present a smooth flat surface to the neoprene lamination on the sealing lid. The outer can dimensions were .975 inch diameter x .630 inch high. The laminated sealing lid had an outside diameter of .937 inch and an inside diameter of .156 inch which was made large enough to clear the rivet body. The lids were composed of .025 inch neoprene laminated to Formica XPN–47 plastic sheet which was also .025 inch thick. A hole was punched into the bottom of the inner cans and ⅛ inch pipe nuts soldered into the inner can bottoms directly over the holes. A small hole was also drilled into the side of the outer can to concentrate the flow of venting gas which ordinarily would escape through the outer crimp. A number of such cells were assembled and the openings in the inner can connected to a cylinder containing carbon dioxide gas to which was affixed a pressure guage. The cells were immersed in water to facilitate the detection of vented gases and the pressure within the cell increased by opening the gas tank valve until escaping bubbles were noted. The pressures at this point as read from the guage were recorded as the venting pressure. The crimping apparatus adjustment was varied until a setting was found which produced cells venting in the desired range.

It was found that cells incorporating the vent control disc of the present invention could be made to vent within the desired range with greater precision than cells having similar structures but which did not contain the vent control disc. After the desired setting of the crimping apparatus was found, venting pressures within the desired range of 50 to 200 pounds per square inch and even within ranges as narrow as from 100 to 150 pounds per square inch could be consistently obtained.

Invention is claimed as follows:

1. In a primary electric cell, in combination, a metal cup adapted to contain the active chemical cell elements and a vent control closure for said cup, said closure comprising: a resilient sealing disc normally engaging the edge of said cup throughout the periphery thereof and means for clamping said disc tightly against said cup edge, said means applying clamping pressure to ensure permanent sealing of said cup throughout the periphery of the edge thereof except at at least one gap of limited peripheral extent whereat sealing pressure is exerted by the resilient strain of the less confined portion of said sealing disc adjacent said gap, whereby gas generated within said cup to a predetermined pressure may lift the edge of said sealing disc at said gap and escape from said cup.

2. In a primary electric cell, in combination, a metal cup adapted to contain the active chemical cell elements and a vent control closure for said cup, said closure comprising: a resilient sealing disc normally engaging the edge of said cup throughout the periphery thereof and means for clamping said disc tightly against said cup edge, said means applying clamping pressure to ensure permanent sealing of said cup throughout the periphery of the edge thereof except at at least one gap of limited peripheral extent whereat sealing pressure of predetermined magnitude is applied by forces within the disc resisting displacement of the portion of the disc at the location of the gap, said sealing pressure being less than said clamping pressure and calculated to permit the escape of gas from said cup upon generation thereof to a predetermined pressure.

3. In a primary electric cell, in combination, a metal cup adapted to contain the active chemical cell elements and a vent control closure for said cup, said closure comprising: a laminated sealing disc having a resilient layer normally engaging the edge of said cup throughout the periphery thereof and a semi-rigid outer layer, and means for clamping said sealing disc tightly against said cup edge, said means applying clamping pressure to said laminated disc to ensure permanent sealing of said cup throughout the periphery of the edge thereof except at at least one gap of limited peripheral extent whereat sealing pressure is exerted by the resilient strain of the less confined portion of said sealing disc adjacent said gap, whereby gas generated within said cell to a predetermined pressure may lift the edge of said sealing disc at said gap and escape from said cell.

4. In a primary electric cell, in combination, a metal cup adapted to contain the active chemical cell elements and a vent control closure for said cup, said closure comprising: (A) a laminated sealing disc having a resilient layer normally engaging the edge of said cup throughout the periphery thereof and a semi-rigid outer layer, and (B) means for clamping said sealing disc tightly against said cup edge comprising (1) a relatively firm vent control disc in pressure contact with said laminated sealing disc, said vent control disc having at least one gap of limited peripheral extent and applying clamping pressure to said laminated disc to ensure permanent sealing of said cup throughout the periphery of the edge thereof except at said gap whereat sealing pressure is exerted by the resilient strain of the less confined portion of said sealing disc adjacent said gap, whereby gas generated within said cup to a predetermined pressure may lift the edge of said sealing disc at said gap and escape from said cup, and (2) means for applying clamping pressure against said vent control disc.

5. In a primary electric cell, in combination, a metal cup adapted to contain the active chemical cell elements and a vent control closure for said cup, said closure comprising: (A) a laminated sealing disc having a resilient layer engaging the edge of said cup throughout the periphery thereof and a semi-rigid outer layer, and (B) means for clamping said disc tightly against said cup edge comprising (1) a relatively firm vent control disc in pressure contact with said laminated sealing disc, said vent control disc having at least one gap of limited peripheral extent and applying clamping pressure to said laminated disc to ensure permanent sealing of said cup throughout the periphery of the edge thereof except at said gap whereat sealing pressure is exerted by the resilient strain of the less confined portion of said sealing disc adjacent said gap, whereby gas generated within said cup to a predetermined pressure may lift the edge of said sealing disc at said gap and escape from said cup, and (2) an outer can telescoped over said cup and crimped thereover, said outer can applying clamping pressure against said vent control disc.

6. In a primary electric cell, in combination, a metal cup adapted to contain the active chemical cell elements and a vent control closure assembly for said cup, said assembly comprising: (1) a laminated sealing disc having a resilient layer normally engaging the edge of said cup throughout the periphery thereof and a semi-rigid outer layer, (2) a relatively firm vent control disc in pressure contact with said laminated sealing disc, said vent control disc having at least one gap of limited peripheral extent and applying clamping pressure to said laminated disc to ensure permanent sealing of said cup throughout the periphery of the edge thereof except at said gap whereat sealing pressure is exerted by the re- silient strain of the less confined portion of said sealing disc adjacent said gap, whereby gas generated within said cup to a predetermined pressure may lift the edge of said sealing disc at said gap and escape from said cup, and (3) an outer can telescoped over said cup and oppositely oriented, the peripheral edge of said outer can being crimped about the bottom of said cup, applying clamping pressure through said vent control disc to said sealing disc.

7. In a primary electric cell, in combination, a metal cup adapted to contain the active chemical cell elements and a vent control closure for said cup, said closure comprising: a resilient sealing disc normally engaging the edge of said cup throughout the periphery thereof and means for clamping said disc tightly against said cup edge, said means applying clamping pressure to ensure permanent sealing of said cup throughout the periphery of the edge thereof except at a plurality of spaced gaps of limited peripheral extent whereat sealing pressure is exerted by the resilient strain of the less confined portion of said sealing disc adjacent said gap, whereby gas generated within said cup to a predetermined pressure may lift the edge of said sealing disc at said gap and escape from said cup.

8. In a primary electric cell, in combination, a metal cup adapted to contain the active chemical cell elements and a vent control closure for said cup, said closure comprising: (A) a laminated sealing disc having a resilient layer normally engaging the edge of said cup throughout the periphery thereof and a semi-rigid outer layer, and (B) means for clamping said sealing disc tightly against said cup edge comprising (1) a relatively firm vent control disc in pressure contact with said laminated sealing disc, said vent control disc having a plurality of spaced gaps of limited peripheral extent and applying clamping pressure to said laminated disc to ensure permanent sealing of said cup throughout the periphery of the edge thereof except at said gaps whereat sealing pressure is exerted by the resilient strain of the less confined portion of said sealing disc adjacent said gap, whereby gas generated within said cup to a predetermined pressure may lift the edge of said sealing disc at said gap and escape from said cup, and (2) means for clamping said vent control disc against said laminated sealing disc.

9. In a primary electric cell, in combination, a metal cup adapted to contain the active chemical cell elements and a vent control closure assembly for said cup, said assembly comprising: (1) a laminated sealing disc having a resilient layer normally engaging the edge of said cup throughout the periphery thereof and a semi-rigid outer layer, a relatively firm vent control disc in pressure contact with said laminated sealing disc, said vent control disc having a plurality of spaced gaps of limited peripheral extent and applying clamping pressure to said laminated disc to ensure permanent sealing of said cup throughout the periphery of the edge thereof except at said gaps whereat sealing pressure is exerted by the re- silient strain of the less confined portion of said sealing disc adjacent said gap, whereby gas generated within said cup to a predetermined pressure may lift the edge of said sealing disc at said gaps and escape from said cup, and (2) an outer can telescoped over said cup and oppositely oriented, the peripheral edge of said outer can being crimped about the bottom of said cup, applying clamping pressure through said vent control disc to said sealing disc.

References Cited in the file of this patent

UNITED STATES PATENTS

| | | |
|---|---|---|
| 1,650,319 | Briggs | Nov. 22, 1927 |
| 2,740,822 | Sexe | Apr. 3, 1956 |
| 2,740,823 | Sexe et al. | Apr. 3, 1956 |
| 2,794,060 | MacFarland | May 28, 1957 |
| 2,816,153 | Kort | Dec. 10, 1957 |
| 2,843,650 | Jacquier | July 15, 1958 |